APPARATUS FOR RESOLVING SPACE CURVE SLOPES INTO ANGULAR SECTORS

Filed Aug. 29, 1963 4 Sheets-Sheet 1

INVENTORS
EVON C. GREANIAS
REINI J. NORMAN
BY Robert E. Sandt
AGENT

United States Patent Office
3,297,988
Patented Jan. 10, 1967

3,297,988

APPARATUS FOR RESOLVING SPACE CURVE SLOPES INTO ANGULAR SECTORS

Evon C. Greanias, Chappaqua, and Reini J. Norman, Mount Kisco, N.Y., assignors to International Business Machines Corporation, New York, N.Y., a corporation of New York Filed Aug. 29, 1963, Ser. No. 305,464
8 Claims. (Cl. 340—146.3)

This invention relates to a hybrid computer, and more particularly to a computer employing a combination of analog and digital elements for the resolution of vectors into a predetermined number of angularly disposed sector headings.

While in some applications, such as fire control and missile guidance, it is necessary to obtain the solution to dynamic vector relationships to within minutes and even seconds of arcs, other applications do not require such precision. Where, for example, the input data itself is not precise, but varies within wide limits and indicates only a class of data or a trend, such precise resolution is not necessary. In shape recognition, and particularly the recognition of handwritten symbols, the recognition of a nearly vertical or nearly horizontal line is sufficient, as individuals vary greatly in the slant and style of their handwriting. Resolution of slopes into a predetermined number of sectors, as for example eight, is therefore, compatible with the significance of the input data. Curved lines and sharp changes in the slopes may be detected by changes in the slopes.

Since an imprinted character represents a two dimensional space figure, any dynamic representation of the displacement curve as a function of time permits a velocity analysis leading to a determination of slopes. If, as in the preferred embodiments, the character scanner operates to follow or trace out the outline of the character, time variant signals representing the successive displacements of the trace are available for processing. These signals, in the form of voltages manifestive of the two dimensional orthogonal displacements, when differentiated produce velocity manifesting voltages. Since any first derivative of a function represents the slope or rate of change of the function with respect to the independent variable, the velocity manifesting voltages are processed to yield the resolution of slopes into the predetermined number of sectors.

Since the input data is in the form of variable voltages, it is efficient to process these voltages in analog form, exploiting the current, voltage, and time relationships inherent in the charging and discharging of an electrical capacitor to achieve the necessary first differential. When these velocities are obtained, their relativity is established to produce binary-like or digital signals indicative of the relative magnitude of the velocities. These digital signals, when logically combined, produce the requisite resolution of the slopes in the various sectors indicative of the line headings or slopes. This combination of analog and digital techniques produces an efficient and simple apparatus which yields digital signals directly without resort to an analog to digital converter. These digital signals, when combined with other digital signals giving additional information as to the shape of the character whose identity is sought to be established, permit of a logical analysis of the features of the character by purely digital methods.

It is, therefore, an object of this invention to produce a hybrid computer operating with analog and digital elements to solve dynamic spatial relationships.

It is a further object to provide a hybrid computer for processing a plurality of dependent variables having a common independent variable so as to establish a relativity between the dependent variables independent of the independent variable.

Another object of the invention is to provide an apparatus for processing time variant waveforms manifestive of the configuration of a two-dimensional space curve and produce signals manifestive of the slope of the space curve.

Yet another object of the invention is to provide an apparatus operative responsive to time variant orthogonally disposed displacement values representing successive points on a curve whose slopes are to be digitized and producing digital signals indicative of the slopes of successive points on the curve.

A more specific object of the invention is to provide an apparatus for continuously resolving the slopes of successive points on an imprinted character into a predetermined number of angular zones.

Yet another specific object of this invention is to provide an apparatus for continuously processing time variant waveforms manifestive of the successive displacements of the trace of an imprinted character and producing therefrom signals indicative of one out of N sectors in which the instantaneous velocity vector lies.

A final and specific object of this invention is to provide an apparatus for processing time variant voltage waveforms manifestive of the successive horizontal and vertical displacements of a curve following apparatus in tracing the configuration of an imprinted character to resolve the successive velocity vectors into a plurality of equi-angular sectors, by differentiating the waveforms, comparing the relative magnitudes of the full and proportionate values of the differentials and logically combining signals manifestive of the relativities of the full and proportionate values of the differentials.

The foregoing and other objects, features and advantages of the invention will be apparent from the following more particular description of preferred embodiments of the invention, as illustrated in the accompanying drawings.

Figure 3:
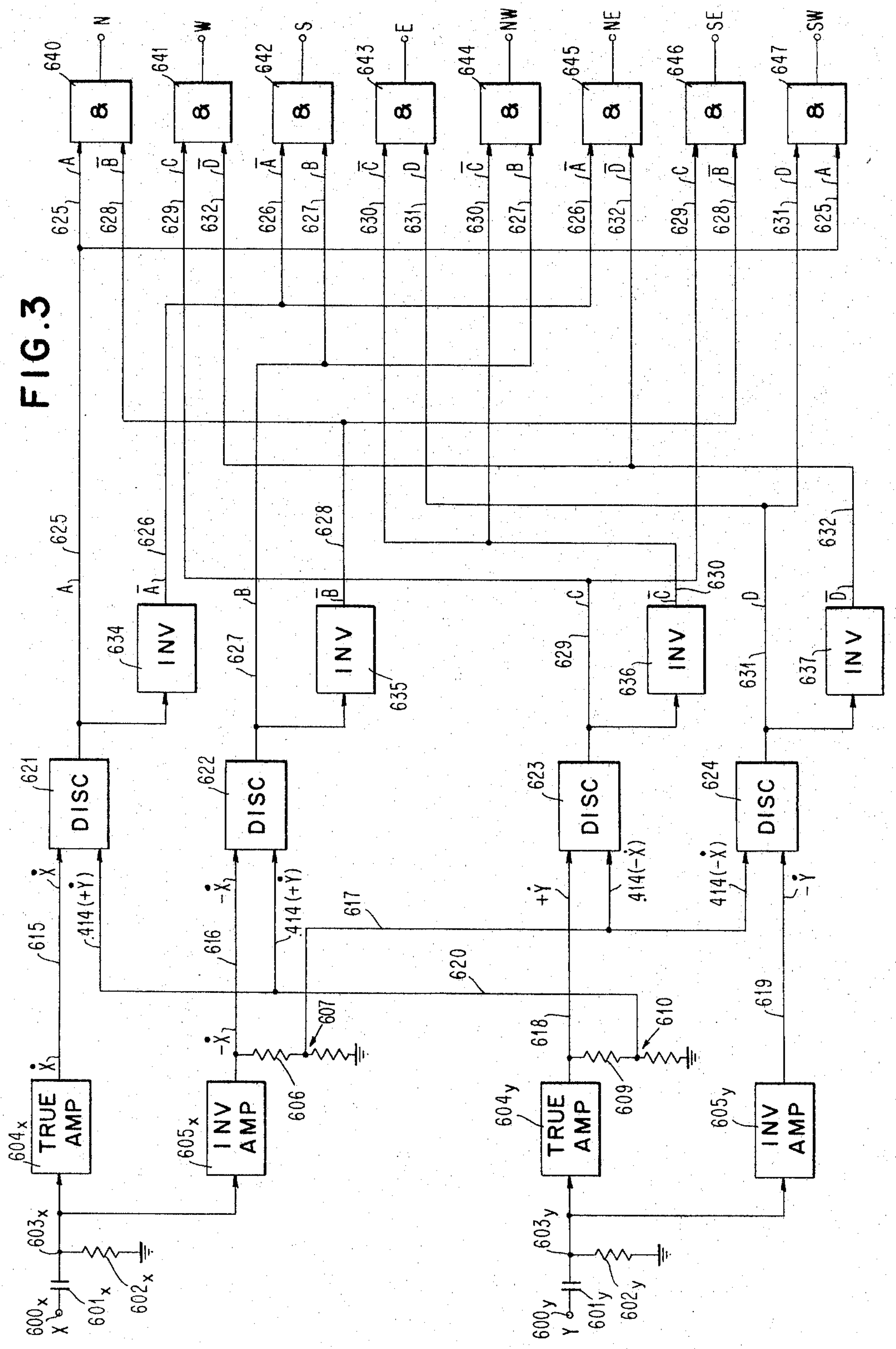
FIG. 3 is a schematic of a second embodiment of the invention for processing the waveforms produced by the apparatus of FIG. 1 to develop eight slope directions.
Figure 4:
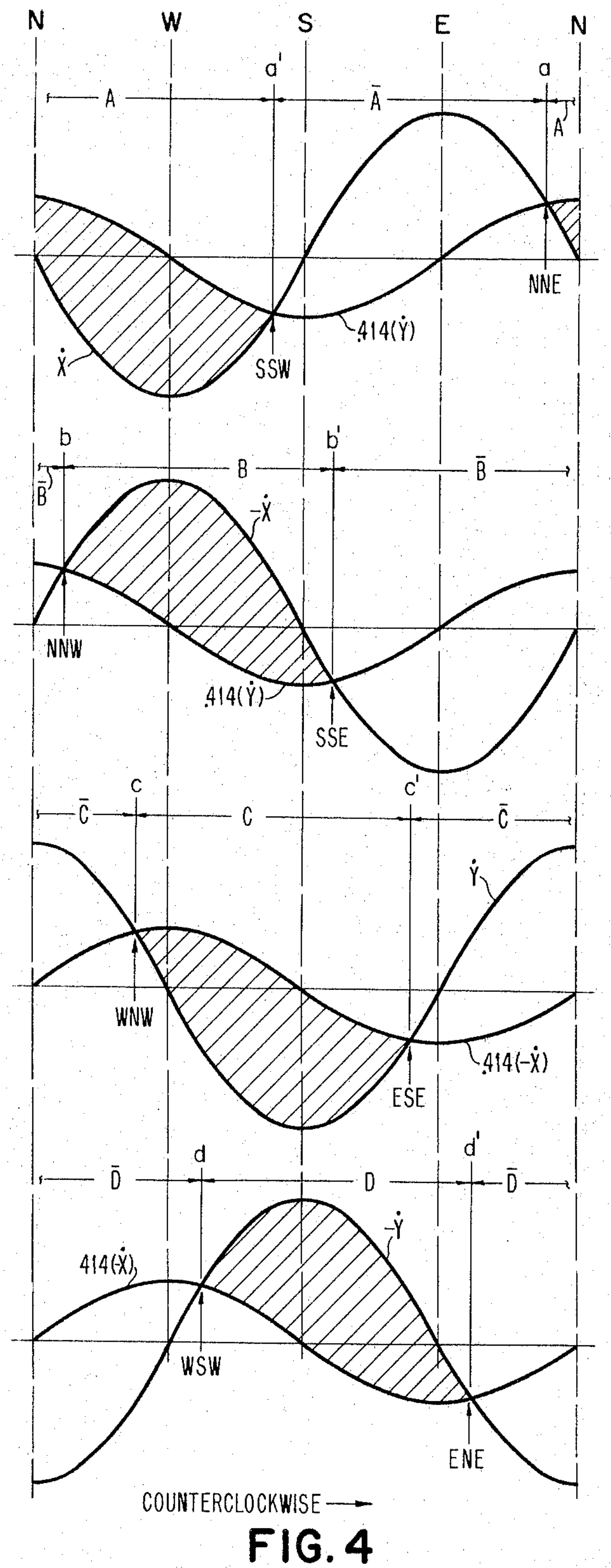

FIG. 4 presents a graphical analysis of the operation of the embodiment of FIG. 3.

Figure 5:
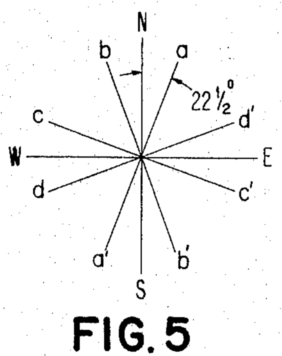

FIG. 5 represents the partitioning diameters employed in FIG. 3 and graphically represented in FIG. 4.

As has been briefly stated, the apparatus constituting the invention processes time variant voltage waveforms representing the successive orthogonal displacements of a space curve to produce signals representing the sectors into which the successive slopes lie. In the particular application in which the apparatus will be described, eight different slope headings are obtained from the processing of waveforms produced by a curve follower employed to trace the outline of an imprinted character in a character recognition machine.

Figure 1:
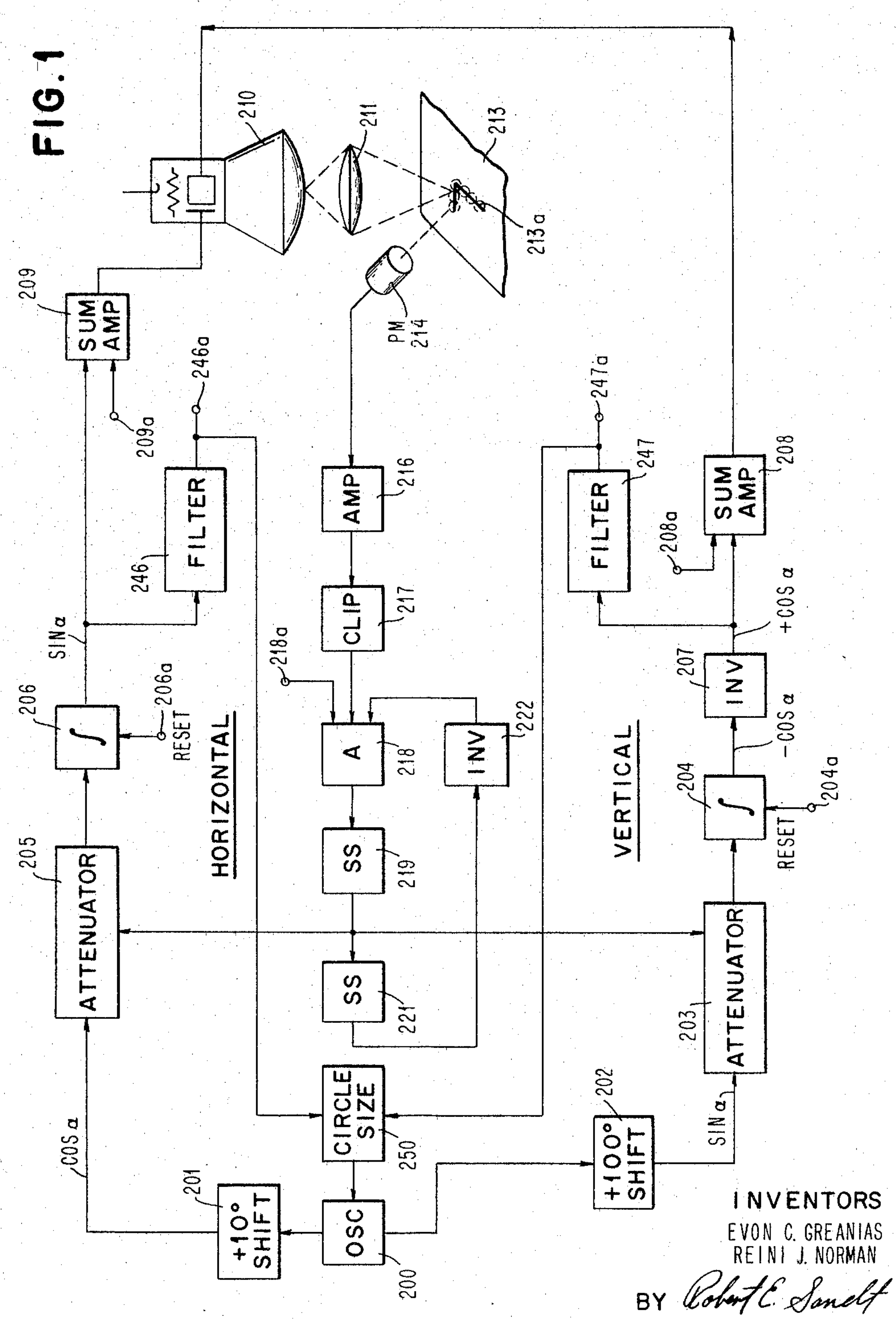
FIG. 1 is a schematic diagram of a curve following apparatus.

The curve follower, shown schematically in FIG. 1, images the spot from the cathode ray tube 210 through suitable optics 211 to the surface of a document 213 with an imprinter character 213*a* whose configuration is to be traced, and serves as the sole illumination thereof. The animation of the electron beam will cause the imaged spot to move over the document, and the reflected light therefrom will be detected by the photomultiplier tube 214, whose response is amplified in amplifier 216 and clipped in clipper 217 to produce an output response whenever the imaged spot passes from the white background into the black of the character.

The animation of the electron beam (and the light spot) is controlled by the conventional deflection circuits under control of the summing amplifiers 208 and 209. Initially, the light is positioned adjacent to the character to be traced by potentials applied to the hubs 208*a* and 209*a* of the summing amplifiers. Thereafter, a controlled dither signal produces the following action.

The oscillator 200 produces sine and cosine waveforms through the $+100°$ shift circuit 202 and $+10°$ shift circuit 201 which pass through the variable gain amplifiers (or attenuators) 203 and 205. The output from the attenuators are integrated in the respective integrators 204 and 206. As is shown, the integrators 204 and 206 yield $-\text{Cos}\ \alpha$ and $\text{Sin}\ \alpha$ outputs. The inverter 207 changes the $-\text{Cos}\ \alpha$ waveform to a $+\text{Cos}\ \alpha$ waveform, as it is desired that the dither be a circular pattern rotating counterclockwise. With $+\text{Cos}\ \alpha$ and $+\text{Sin}\ \alpha$ applied to the summing amplifiers 208 and 209, the imaged trace upon the document will be a circle of a given diameter. If this trace intercepts the black of the character (as it will upon the initial positioning of the beam), the clipper 217 impulse will energize AND gate 218 to fire the single-shot 219 which has a pulse duration of 180° of beam time. When the single-shot 219 fires, and for the duration of its output pulse, the attenuators 203 and 205 will have their gain reduced by a constant divisor factor so as to reduce the amplitude of the waveforms applied thereto. This will produce a small semi-circular trace actually within the black of the character line. Upon cessation of the pulse from single-shot 219, the gain of the attenuators returns to normal until the next black hit is encountered. The extinction of the pulse from single-shot 219 fires single-shot 221 which through inverter 222 depotentializes AND gate 218 for the duration of the pulse (30°) so as to prevent spurious operation as the tracing beam leaves the black of the line. The hub 218*a* is normally potentialized during follower operation and is depotentialized when it is desired to inactivate the follower operation, as when proceeding through a character to the next character.

Figure 2:
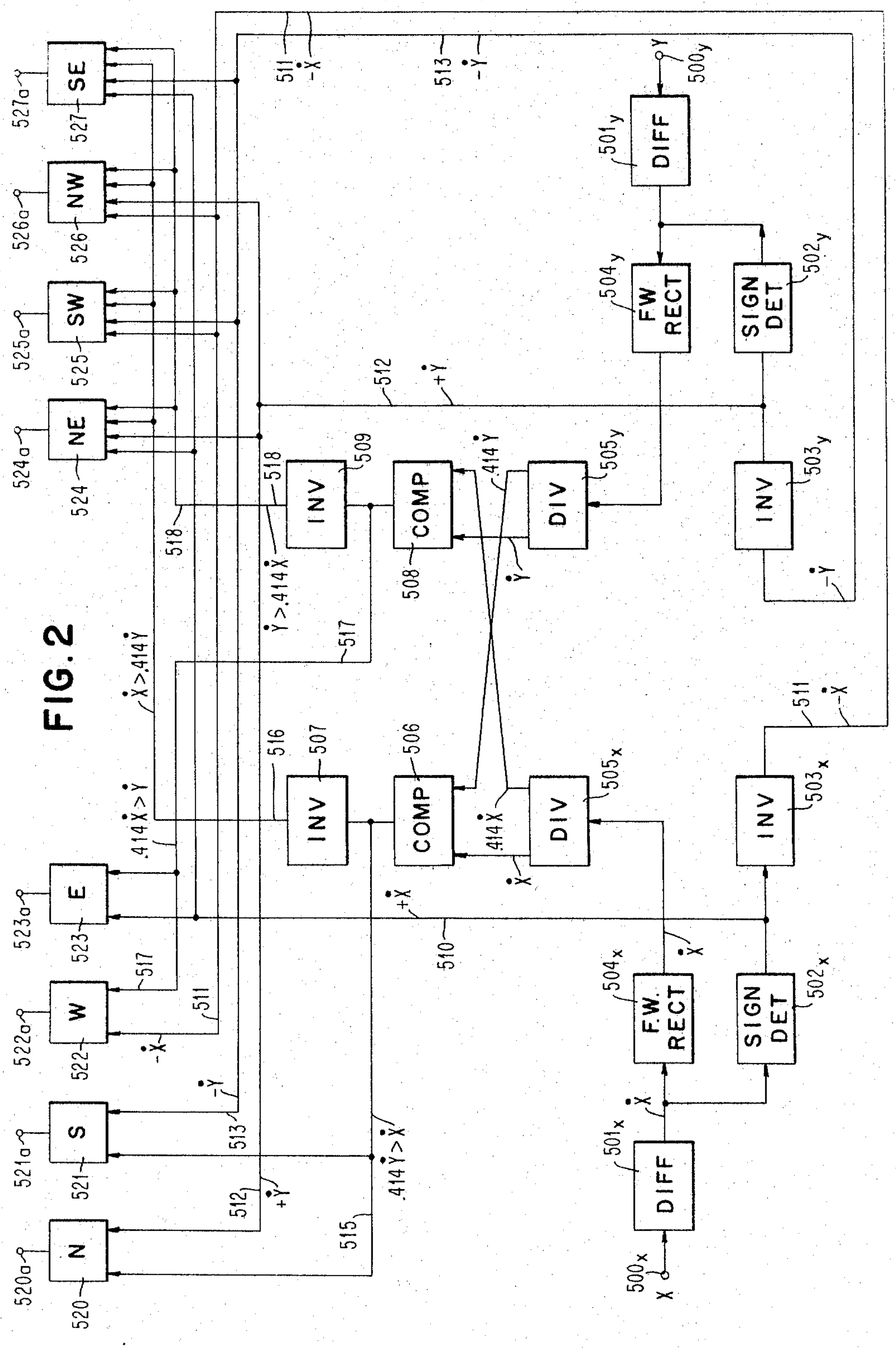
FIG. 2 is a schematic diagram of a first embodiment of the invention for processing the waveforms produced by the apparatus of FIG. 1 to develop eight slope directions.

By the controlled alternate integration of two different amplitudes of sine and cosine waveforms, the electron beam will be animated to follow the configuration of the outline of the character and produce time variant waveforms representing the X and Y displacements of the beam as it traces the character. These waveforms include the gross beam movement and the circular dither. However, through the intervention of the filters 246 and 247, the high frequency circular dither components are removed. Only the relatively slowly varying voltages representing the gross beam movement (and the shape of the character) are available as output waveforms at the hubs 246*a* and 247*a*. It is these filtered waveforms representing the X and Y displacements of the tracing beam that are processed by the circuits of FIG. 2 or FIG. 3 to produce the resolution into the requisite eight vector headings. In FIG. 2, the X displacement voltages are connected to the hub $\mathbf{500}_x$ and the Y voltages to the hub $\mathbf{500}_y$. In FIG. 3, the comparable input hubs are $\mathbf{600}_x$ and $\mathbf{600}_y$.

Before proceeding with an examination of the circuits constituting the invention, it is well to set forth those mathematical relationships which are exploited in the practice of this invention. As is well known, the first derivative of any dependent variable with respect to the independent variable measures the slope of curve representing the dependent variable as a function of the independent variable. If the dependent variable represents displacement as a function of time, then the first derivative represents velocity. If the dependent variable represents, as it does in the preferred embodiment, X displacement as a function of time, then the first derivative with respect to time represents the velocity in the X direction. Since movement in the X direction can only lie along the axis, the velocity vector in the X direction can only have sign and magnitude. This is also true of Y velocities. If, however, waveforms representing two dimensional movement as a function of time are processed, the resultant velocity vector may vary in both magnitude and direction. This two-dimensional movement may be represented in polar or cartesian coordinates, but nevertheless, still requires processing of coordinates. Therefore, if in the cartesian system, X and Y displacements are separately differentiated and their first differentials vectorially added, the resultant vector will have both magnitude and angular direction. The magnitude may also be obtained by application of the Pythagorean theorem, and the direction by computation of the tangent of the angle, with due cognizance being taken of the signs of the component vectors.

Since the instant invention is concerned only with the direction or heading of the velocity vector, neither vector addition nor the Pythagorean computation need be performed. Further, since it is desired to apportion the vector directions into a limited number of sectors, the necessity for the tangent computation is obviated. As will be developed, the instant invention is designed to produce eight different headings, corresponding to the eight points on the compass rose. Thus, by comparison of the relative magnitudes of the X and Y velocities and use of the signs of these velocities, the eight compass directions may be developed.

Examining first the respective signs of the X and Y velocities, it is recalled that positive X velocities denote an easterly movement, and negative X velocities a westerly movement. Similarly, positive Y velocities denote a northerly movement, and negative Y velocities, a southerly movement. By logical combinations of the signs of the X and Y velocities, the vector heading may be positioned in any one of the four quadrants. The only remaining information required for complete allocation of any vector heading into the eight sectors is the magnitude of the tangent. Since the tangent of the vector angle is the ratio of the X and Y velocities, and only eight sectors are involved, recognition need be had of only two angles, namely 22½° and 67½°. If the angle is less than 22½°, then the vector heading is either east or west, depending on the sign of the X velocity. If the angle is greater than 22½°, but less than 67½°, than the vector heading is either NE, NW, SE, or SW, depending on the signs of the X and Y velocities. Finally, if the angle is greater than 67½°, then the heading will be either north or south depending on the sign of the Y velocity.

In accordance with the foregoing relationships, advantage is taken of the tangent of 22½° (as well as the cotangent of 67½°) namely, .414. If $.414\dot{X}$ (X velocity) and $.414\dot{Y}$ (Y velocity) are computed and compared with $\dot{Y}$ and $\dot{X}$ respectively, then the following relationships may be obtained:

(1) $|\dot{X}|>.414|\dot{Y}|$ heading is E, NE, NW, W, SW, SE
(2) $.414|\dot{Y}|>|\dot{X}|$ heading is N or S
(3) $|\dot{Y}|>.414|\dot{X}|$ heading is NE, N, NW, SW, S, or SE
(4) $.414|\dot{X}|>|\dot{Y}|$ heading is E or W.

The velocity sign relationships are as follows:

(A) $+\dot{X}$ and $+\dot{Y}$ heading is in first quadrant
(B) $+\dot{X}$ and $-\dot{Y}$ heading is in fourth quadrant
(C) $-\dot{X}$ and $+\dot{Y}$ heading is in second quadrant
(D) $-\dot{X}$ and $-\dot{Y}$ heading is in third quadrant.

The eight compass headings may be obtained by logically combining the foregoing relationships as follows:

NORTH $|\dot{Y}|$ is positive, and $.414|\dot{Y}|>|\dot{X}|$
SOUTH $|\dot{Y}|$ is negative, and $.414|\dot{Y}|>|\dot{X}|$
EAST $|\dot{X}|$ is positive, and $.414|\dot{X}|>|\dot{Y}|$
WEST $|\dot{X}|$ is negative, and $.414|\dot{X}|>|\dot{Y}|$
NE $|\dot{X}|$ is positive, and $|\dot{Y}|$ is positive, and $|\dot{Y}|>.414|\dot{X}|$, and $|\dot{X}|>.414|\dot{Y}|$
NW $|\dot{X}|$ is negative, and $|\dot{Y}|$ is positive, and $|\dot{Y}|>.414|\dot{X}|$, and $|\dot{X}|>.414|\dot{Y}|$
SE $|\dot{X}|$ is positive, and $|\dot{Y}|$ is negative, and $|\dot{Y}|>.414|\dot{X}|$, and $|\dot{X}|>.414|\dot{Y}|$
SW $|\dot{X}|$ is negative, and $|\dot{Y}|$ is negative, and $|\dot{Y}|>.414|\dot{X}|$, and $|\dot{X}|>.414|\dot{Y}|$ The foregoing logical expressions are implemented by the apparatus of FIG. 2 wherein the time variant X and Y displacement voltages are applied to the hubs 500$_x$ and 500$_y$ respectively. Since the X and Y voltage processing circuits are identical, a description of one applies equally well to the other. Therefore, the subscripts "X" and "Y" will apply to the reference numerals identifying the counterpart components in each section. The X displacement voltages of the hub 500$_x$ are differentiated in the differentiator 501$_x$ to produce a voltage manifestive of the X velocity ($\dot{X}$). Since velocities may be either positive or negative, and the signs of the velocity components are necessary for the logic, the voltage measuring the X velocity is connected to the sign detector 502$_x$, which produces a constant amplitude output signal whenever the voltage output from differentiator 501$_x$ exceeds zero voltage. The output from sign detector 502$_x$ is connected to the line 510 as a logical input manifestation of a positive X velocity, and to the inverter 503$_x$ to produce therefrom a constant amplitude output signal when the sign detector produces no output. The inverter 503$_x$ feeds line 511 to signal negative X velocities. Thus, one of the lines 510 or 511, but never both, will have a signal potential thereon indicative respectively of a positive or negative X velocity component.

The $\dot{Y}$ voltage processor will similarly produce a signal on the line 512 indicative of a positive Y velocity, or a signal on line 513 indicative of a negative Y velocity. These signals are also of constant amplitude and independ of the magnitude of the velocity voltage input.

Since the measurement of the vector headings is performed as if the vectors all lie in the first quadrant only, positive values of the X and Y velocities need be processed. The sign combinations, once the vector headings in the first quadrant are established, will provide the 90° or 180° rotation thereof. Therefore, the output from the differentiator 501$_x$ (measuring $\dot{X}$) is passed through the full wave rectifier 504$_x$, and will appear at the output thereof as a positive voltage. This positive voltage from the full wave rectifier is divided in a voltage divider circuit 505$_x$ to produce a positive voltage which is equal to the input voltage, and a second voltage equal to .414 times the input voltage. The divider 505$_y$ produces output voltages in the same manner and bearing the same relationship to the input voltage applied thereto as a measure of the Y velocity.

The $\dot{X}$ voltage output from the divider 505$_x$ and the $.414\dot{Y}$ voltage output from the divider 505$_y$ are compared in the voltage comparator 506. This comparator produces a constant amplitude output signal on the line 505 whenever the relationship of the input voltages thereto satisfies the relationship $.414\dot{Y}>\dot{X}$. The converse relationship of $\dot{X}>.414\dot{Y}$ is obtained by connecting the output of comparator 506 through the inverter 507 to the line 516.

A second comparator 508 compares the voltage output measuring $.414\dot{X}$ from divider 505$_x$ and the voltage output measuring $\dot{Y}$ from divider 505$_y$ and produces a constant amplitude output signal on the line 517 whenever $.414\dot{X}>\dot{Y}$. The converse relationship ($\dot{Y}>.414\dot{X}$) is signalled on the line 518 by connecting the output from the comparator 508 through inverter 509 to the line 518.

With the foregoing connections, signals on certain of the lines are mutually exclusive. Signals cannot appear simultaneously on any pair of lines having a direct and an inverted feed. Not only is this apparent from the very nature of an inverter, but also logical when one examines the paired lines. For example, in the sign lines 510 and 511, it is obviously impossible to have both a positive and negative X velocity. So also in the relative magnitude signal lines, it is impossible to have simultaneous signals on the line pairs 515 and 516 or 517 and 518.

It is possible and necessary to have at least four signals in order to establish the NE, SW, NW, and SE vector headings. The logic here requires the four combination of signs ($+\dot{X}$, $+\dot{Y}$; $+\dot{X}$, $-\dot{Y}$; $-\dot{X}+\dot{Y}$; $-\dot{X}-\dot{Y}$) and $\dot{X}>.414\dot{Y}$ and $\dot{Y}>.414\dot{X}$. Since these latter signals appear on the lines 516 and 518 which are the inverted outputs of lines 515 and 517 none of the N, S, E, and W logic equations can be satisfied simultaneously with any of the NE, SW, NW, or SE logic requirements.

In order to implement the logic statements previously set forth, AND gates 520 through 527 are provided. The gates 520 through 523 are two input devices, while those from 524 through 527 are four input devices. Gates 520 and 521 have a common input from the line 515 supplying a signal manifestive of the relationship $.414\dot{Y}>\dot{X}$, which relationship means that the vector falls within a 45° sector symmetrically disposed about the north-south axis. The addition of an input from either the line 512($+\dot{Y}$) or line 513($-\dot{Y}$) resolves the vector into a north or south vector.

The AND gates 522 and 523 receive the common input from line 517 ($.414\dot{X}>\dot{Y}$), signalling that the vector lies with that 45° sector symmetrically disposed about the east-west axis. The addition of a signal on line 510($+\dot{X}$) or 511($-\dot{X}$) completes the resolution into an east vector or a west vector, respectively.

The AND gates 524 through 527 all require simultaneous inputs from the lines 516 and 518. A signal on line 516 indicates the vector subtends an angle with the east axis of less than 67½°, while that on line 518 signals the vector angle is greater than 22½°. The combination of these two signals locates the heading in that 45° sector symmetrically disposed about the bisector of each quadrant. The four combinations of velocity signs completes the allocation to the appropriate quadrant. Thus, signals on 510 and 512($+\dot{X}$ and $+\dot{Y}$) produces a NE heading. Other headings are similarly produced.

The circuit, hereinabove described will produce an output on one of the output hubs 520*a* through 527*a* so long as varying waveforms are applied to the hubs 500$_x$ and 500$_y$. To have any mathematical significance, the applied waveforms must have a common independent variable. For example, if a sine wave were applied to 500$_x$ and cosine to 500$_y$ both having the same amplitude and periodicity, then the outputs from the AND gates would follow the sequence W, SW, S, SE, E, NE, N, and NW for a counter-clockwise movement in a circular path. A rectilinear path squared with the axes would yield a succession of W, S, E, and N headings. An octagonal path would yield the circular response.

If a curve follower, such as that shown in FIGURE 1 were providing the X and Y displacement waveforms to the hubs 500$_x$ and 500$_y$ and the curve follower were tracing a capital "L," then the succession of headings, as the follower action proceeded counter-clockwise around the character, would be S, E, W, N, and S, because the curve follower recognizes a line as having finite thickness and actually follows the boundary separating the line from the background.

While only eight vector headings have been shown, it will readily be appreciated that a finer resolution can be achieved by providing more outputs from the dividers $505_x$ and $505_y$ and more comparators such as 506 and 508 to establish the necessary relativities between the magnitudes of the X and Y velocities. If, for example, sixteen headings were required, then the sectors would be reduced to 22½° and the comparisons would be premised on the values of the tangents of 11¼° and 33¾°. The tangents of the angles 56¼° and 78¾° are the inverse of those of 33¾° and 11¼°. North, for example, would require that $.1989\dot{Y}>\dot{X}$ with $\dot{Y}$ positive. NNE would require that $\dot{X}>.6682\dot{Y}$, and $\dot{Y}>.6682\dot{X}$. The cardinal points would still require only two input AND gates, while the intervening points will require four input AND gates, two to define the sector limits and two for the sign combinations.

In the second embodiment (shown in FIG. 3), the full circle is effectively divided into four pairs of semi-circles by four diameters so angularly disposed that each of the required eight compass headings fall within at least two semi-circles, the respective diameters of which bracket the sector in which the desired heading lies. These diameters and their corresponding pairs of semi-circles are shown in FIG. 5. The *a–a'* diameter is inclined 22½° clockwise with respect to the north-south axis, giving it a NNE by SSW heading. The *a–a'* diameter partitions the circle into the A and $\overline{A}$ (not A) semi-circles, the A circle extending counter-clockwise from *a* to *a'*. The *b–b'* diametral line is inclined 22½° counter-clockwise with respect to the north-south axis, giving it a NNW by SSE heading, and divides the circle into the B and $\overline{B}$ semi-circles. The B semi-circle extends counter-clockwise from *b* to *b'*. The *c–c'* and *d–d'* diameters are similarly inclined 22½° clockwise and counter-clockwise respectively to the east-west axis. The C and D semi-circles extend counter-clockwise from the corresponding unprimed letters to the primed letters. In all cases, the "NOT" semi-circles are symmetrically disposed about the diameter with their corresponding semi-circles.

Thus, it will be seen from an examination of FIG. 5, that each of the eight compass headings into which it is desired to resolve the velocity vectors lies in four different semi-circles. Two of these four semi-circles are, however, redundant for uniquely defining the sector in which the heading lies. Since eight sectors constitute the resolution, it will be seen that each of these sectors has only two semi-circles which overlap by no more than 45°. Expressed in another fashion, each 45° sector is bracketed by two radii which limit the sector. These same radii are included in the corresponding diameters that partition the semi-circles. Therefore, only those semi-circles are chosen whose diameters bracket the sector. For example, a northeast vector will lie in the semi-circles $\overline{A}$, $\overline{B}$, $\overline{C}$, and $\overline{D}$. However, the sector is bracketed by the O*a* and O*d'*, which radii are included in the diameters *a–a'* and *d–d'* which partition the respective semi-circles A, $\overline{A}$, and D, $\overline{D}$. Therefore, the northeast heading is uniquely defined as $\overline{A}$ and $\overline{D}$. The same rationale may be analogously applied to the other headings to obtain the following expressions:

| | |
|---|---|
| North $A\overline{B}$ | South $\overline{A}B$ |
| Northwest $B\overline{C}$ | Southeast $\overline{B}C$ |
| West $C\overline{D}$ | East $\overline{C}D$ |
| Southwest AD | Northeast $\overline{A}\overline{D}$ |

Inspection of the foregoing expressions will reveal that diametrically opposite headings are the logical inversion of one another. Assuming for the moment that signals manifestive of the presence or absence of a vector within a given semi-circle can be generated, it will be readily apparent that the foregoing expressions are readily susceptible to implementation by the simple expedient of logically ANDing the requisite signals.

Before proceeding with the implementation of the logical combinations of the foregoing expression, it is necessary to examine the necessary mathematical relationships which are exploited to provide the diametral partioning into the requisite semi-circles.

In this, as in the previous embodiment, it is desirable to make the heading computation independent of time. Again, advantage is taken of the value .414 which is the tangent of 22½° (co-tangent 67½°). Since time-varying X and Y displacement voltages are available, the differentiation of these voltages to produce the first derivatives, the X and Y velocities, will permit comparison of their relative magnitudes to remove time as a variable. Thus, the velocity heading circuits will operate independently of the speed at which the curve follower traces out the character to be recognized. The whole comparison scheme is premised upon the foregoing tangent value. Most simply stated, if, for example, the Y velocity ($\dot{Y}$) is greater than $.414\dot{X}$, then (assuming both $\dot{X}$ and $\dot{Y}$ are positive) the resultant vector is disposed at an angle greater than 22½° with respect to the X axis. However, since it is necessary to define at least four different semi-circles in terms of the relative magnitudes of the X and Y velocities, the mathematics becomes a little more illusory.

The semi-circles partitioned by the diameter *a–a'* have been identified as A and $\overline{A}$. The significance of this may now begin to be appreciated. If we can define A, then $\overline{A}$ is that which fails the definition of A. The definition is obtained by setting forth the realtionship of $\dot{X}$ and $\dot{Y}$ that satisfies all conditions for the semi-circle swept by counter-clockwise rotation from *a* to *a'* in FIG. 5. This relationship, expressed in words, is that .414 times the Y velocity ($\dot{Y}$) shall be more positive than unity times the X velocity ($\dot{X}$). Let us now examine this relationship in each of the first, second, and third quadrants in which the A semi-circle lies.

In the first quadrant, for a resultant velocity vector heading of NNE (22½° clockwise from north), $\dot{X}=.414\dot{Y}$, as both $\dot{X}$ and $\dot{Y}$ are positive. If $\dot{X}>.414\dot{Y}$, then the resultant vector must incline more than 22½° from north. So long as $.414\dot{Y}>\dot{X}$, the resultant vector must lie at least between NNE and N counter-clockwise of *a*, and in the A semi-circle.

For a resultant vector in the second quadrant, $\dot{X}$ becomes negative while $\dot{Y}$ (and $.414\dot{Y}$) remains positive. Therefore, regardless of the relative magnitudes of the two vectors, $.414\dot{Y}$ must be more positive than $\dot{X}$, particularly since both cannot be equal to zero (except for no movement).

For resultant vectors in the third quadrant, where both $\dot{X}$ and $\dot{Y}$ are negative, the relative magnitudes of the vectors becomes important, as in the first quadrant. For a slightly off-west vector in the third quadrant, $\dot{X}$ will be maximum negative and $\dot{Y}$ will approach zero. Therefore, $.414\dot{Y}$ will be less negative (more positive) than $\dot{X}$. As the vector rotates counter-clockwise, $\dot{X}$ becomes less negative and $\dot{Y}$ becomes more negative. At SW $\dot{X}=\dot{Y}$, but $.414\dot{Y}$ is still less negative (more positive) than $\dot{X}$. In the limit (at SSW), $\dot{X}=.414\dot{Y}$ (both negative). Clockwise of this limit, $\dot{X}$ becomes more negative than $.414\dot{Y}$, which also becomes increasingly negative, but at a lesser rate. Counter-clockwise of SSW, $.414\dot{Y}$ becomes more negative than X and the limit of the semi-circle A is reached.

So as to show the relativity of $\dot{X}$ and $.414\dot{Y}$ throughout the full circle, and to present the relationship graphically, reference is made to the first wave of FIG. 4. Here, $\dot{X}$ and $.414\dot{Y}$ are plotted with respect to the compass rose as the independent variable. It is assumed that the resultant velocity vector is constant in magnitude and is merely rotated around the circle so as to traverse all possible headings. For any rotating vector, the X and Y components thereof will vary as the sine and cosine (or vice versa) of the displacement angle from some fixed reference. The components will, therefore, have the same waveforms, but displaced by one-quarter wavelength. If interest is had, as it is here in .414$\dot{Y}$, then since $\dot{Y}$ will vary sinusoidally, the constant merely changes the amplitude of the wave but not its periodicity. Therefore, in the first wave of FIG. 4, $\dot{X}$ has a value of zero at north and south vector headings and a sine distribution therebetween. The Y velocity component is zero at west and east vector headings, and has a cosine distribution therebetween. Since .414 times $\dot{Y}$ is of interest, the amplitude of the basic $\dot{Y}$ cosine curve is reduced to .414 of the full valued curve. Visual inspection of the relative magnitudes of the two curves of .414$\dot{Y}$ and $\dot{X}$ reveals that at NNE and SSW, .414$\dot{Y}=\dot{X}$, and that from NNE counter-clockwise to SSW. .414$\dot{Y}>\dot{X}$ (more positive). This inequality is shown by the shading between the curves and the expanse labelled "A." $\overline{A}$ is the inverse of this relationship, extending counter-clockwise from SSW to NNE.

The B and $\overline{B}$ semi-circles as partitioned by the diameter *b–b'* are defined by the expression $(-\dot{X})>.414(+\dot{Y})$. This expression means that the inversion (180° phase shift of $\dot{X}$ is greater than (more positive) than .414 of the true value of $\dot{Y}$. This then permits of the derivation shown graphically by the second group of curves in FIG. 4. Here the .414$\dot{Y}$ curve is the same as in the preceding curves, with positive values in the first and second quadrants, negative values in the third and fourth quadrants, and zero value at east and west. The $\dot{X}$ curve, however, is phase shifted 180° with respect to the previous curve, still having zero value at north and south. An east vector, normally a maximum positive $\dot{X}$ is now negative, while the west vector (normally negative) is now positive. Visual inspection reveals that from NNW counter-clockwise to SSE$-\dot{X}>.414\dot{Y}$, proving the validity of the expression for the B circle.

Similar derivations have been achieved for the C and $\overline{C}$ semi-circles and the D and $\overline{D}$ semi-circles. These are respectively graphically illustrated in the third and fourth curves of FIG. 4. The C semi-circle is defined by the expression $.414(-\dot{X})>\dot{Y}$, which means that .414 times the 180° phase shifted $\dot{X}$ velocity vector is greater than the $\dot{Y}$ velocity vector. In FIG. 4 (third set of curves), $\dot{Y}$ is shown with full amplitude and in its true relationship to the axes. The $\dot{X}$ velocity vector, however, is inverted, or phase shifted 180°, and reduced to .414 of its normal amplitude. The shaded area between the curves from WNW (counter-clockwise to ESE measures the requisite inequality defining the C semi-circle.

The final set of curves in FIG. 4 plots $-\dot{Y}$ (inverted full amplitude) and $.414(-\dot{X})$ inverted .414 of full amplitude, to show the relationship of these two variables. The expression $-\dot{Y}>.414(-\dot{X})$, defining the D semi-circle, is satisfied from WSW to ENE (shaded area).

From the foregoing graphical analysis of the relationship of the X and Y velocity vectors, it should be apparent that the mathematical relationships support the apportionment. That a constant magnitude resultant vector was chosen for the purposes of illustration does not destroy the validity of the analysis. Any non-constant vector will merely increase or decrease the values of $\dot{X}$ (and .414$\dot{X}$) and $\dot{Y}$ (and .414$\dot{Y}$), as well as their inverts, by a proportionality factor; their relativity will not be destroyed.

Turning now to FIG. 3 which shows the implementation necessary to satisfy the foregoing relationships, it will be remembered that time varying voltages manifestive of the instantaneous X and Y displacements of a movement are available at the hubs 600$_x$ and 600$_y$. These voltages are differentiated in the capacitor resistor circuit to produce a voltage proportional to the rate of change of the input voltages. Since $\dot{X}$ and $\dot{Y}$ circuits are similar, only one need be examined in detail. Through use of the subscripts *x* and *y*, the description may be equally applied to the horizontal or vertical circuits by mere substitution of subscripts for equivalent components.

The time varying voltage appearing at the hub 600$_x$ will either charge or discharge capacitor 601$_x$ through the resistor 602$_x$ to ground, causing a current flow in the resistor 602$_x$ and a consequent potential difference thereacross. The potential of the point 603$_x$ will, therefore, manifest the magnitude and direction of current flow through the resistor, and will vary with respect to ground as a function of the rate of change of the input voltage on the hub 600$_x$. This potential at the point 603$_x$ will, therefore, represent the X velocity, since the potential on the hub 600$_x$ represents X displacement. The voltage at the point 603$_x$ when amplified in the true amplifier 604$_x$ and the inverting amplifier 605$_x$ will yield voltages respectively manifesting $+\dot{X}$ and $-\dot{X}$. Both of these amplifiers are linear D.C. amplifiers with a high input impedance so as not to affect the capacitor resistor differentiating circuit with an unduly low impedance load. Since the partitioning circuits require an additional input of $.414(-\dot{X})$, see FIG. 4 first set of curves, the resistor 606 has a tap 607 which is connected at a point along the resistor representing .414 of the total resistance of the resistor 606. Thus, the voltage developed at the tap 607 of resistor 606 will be .414 times that on the line 616 representing the full value of $-\dot{X}$.

The differentation of the Y displacement voltages and the production of voltages representing $+\dot{Y}$ and $-\dot{Y}$ is achieved with apparatus identical to that described for processing the X voltages. Since $.414(+\dot{Y})$ is required for the partitioning of the circles, A, $\overline{A}$, B, and $\overline{B}$, the resistor 609 and its tap 610 are connected from the $+\dot{Y}$ line 618 to ground as opposed to the connection of the resistor 606 to the $-\dot{X}$ line 616 in the X voltage processing circuits. Other than this difference the two circuits are identical.

The voltages representing $\dot{X}$, $-\dot{X}$, $.414(-\dot{X})$, $\dot{Y}$, $-\dot{Y}$, and $.414(+\dot{Y})$ appear respectively on the lines 615, 616, 617, 618, 619, and 620. These lines are connected to the discriminators 621, 622, 623, 624 as follows:

Disc. 621, Inputs 615 and 620
Disc. 622, Inputs 616 and 620
Disc. 623, Inputs 618 and 617
Disc. 624, Inputs 617 and 619

The discriminator 621 partitions the A and $\overline{A}$ semi-circles and compares the values $.414(+\dot{Y})$ with $+\dot{X}$ and produces a constant amplitude output so long as the value of $.414(+\dot{Y})$ is greater (more positive) than $+\dot{X}$, as is required by the expression graphically shown in the first set of curves in FIG. 4.

The discriminator 622 compares the value of $-\dot{X}$ with that of $.414(+\dot{Y})$ and produces a constant amplitude output signal so long as the former value is greater than the latter value. An output from this discriminator manifests the presence of the resultant velocity vector in the B semi-circle. It detects the comparison graphically shown in the second set of curves in FIG. 4.

The partitioning of the C and $\overline{C}$ semi-circles is achieved in the discriminator 623 which compares the values of $.414(-\dot{X})$ with that of $+\dot{Y}$ and produces an output response when the former exceeds the latter. The function, shown graphically in the third set of curves of FIG. 4, is achieved in this discriminator.

Finally, the relative magnitudes of the functions graphically shown in the fourth set of curves in FIG. 4, which functions define the D and $\overline{D}$ semi-circles, are compared in the discriminator 624, wherein the voltages manifestive of $-\dot{Y}$ and $.414(-\dot{X})$ are compared and an output signal produced so long as the former exceeds the latter.

All of the discriminator devices 621, 622, 623, and 624 are voltage comparators, which compare the relative magnitudes of the two input voltages and produce a constant amplitude output signal whenever the voltage on one of the input lines is more positive than the voltage appearing on the remaining input line. Obviously, both input voltages may be positive, both negative, or one positive and the other negative. The combination of input voltages are shown in FIG. 4, and each of the discriminators is capable of processing all combinations of input voltages. Whether these discriminators compare the actual voltages as generated, or the actual voltages to which a constant pedestal voltage is added to raise the voltages above ground, or some arbitrary reference, is immaterial. It suffices that they compare the relative magnitudes of the input voltages and produce a constant amplitude output pulse (as by energization of an astable multi-vibrator) to produce the binary-like signal required for the logical processing.

The outputs from the discriminator 621 indicates the presence of the resultant velocity vector in the A semicircle. This output appears on the line 625 as a constant amplitude signal so long as the vector lies in the A semicircle. If the discriminator 625 produces no output, the inverter 634 is activated to produce a signal on the line 626 manifestive of the presence of the vector in the $\bar{A}$ semi-circle. Obviously, signals cannot appear simultaneously on the lines 625 and 626, as they are mutually exclusive.

The outputs from the remaining discriminators 622, 623, and 624 produce outputs respectively on the lines 627, 629 and 631 and inverted outputs through inverters 635, 636, and 637, respectively on the lines 628, 630, and 632. In accordance with the logical requirements, previously set forth and discussed in detail, the eight signal lines indicating the presence of the resultant velocity vector in the eight semi-circles (A, $\bar{A}$, B, $\bar{B}$, C, $\bar{C}$, D, and $\bar{D}$) are combinatorially ANDed in the AND gates through 647 as follows:

| AND Gate | Input Lines | Input Signals | Output |
|---|---|---|---|
| 640 | 625 and 628 | A $\bar{B}$ | North. |
| 641 | 629 and 632 | C $\bar{D}$ | West. |
| 642 | 626 and 627 | $\bar{A}$ B | South. |
| 643 | 630 and 631 | $\bar{C}$ D | East. |
| 644 | 630 and 627 | B $\bar{C}$ | Northwest. |
| 645 | 626 and 632 | $\bar{A}$ $\bar{D}$ | Northeast. |
| 646 | 629 and 628 | $\bar{B}$ C | Southeast. |
| 647 | 631 and 625 | A D | Southwest. |

In summary of the foregoing detailed description, it is seen that X and Y displacement voltages are continuously differentiated to obtain X and Y velocity-measuring voltages. These velocity voltages are amplified to yield true and inverted voltages, which, through voltage dividers, produce voltages related to the true and inverted voltages by the tangent of 22½° (.414). The full true and inverted voltages are combinatorially compared with .414 times the true and inverted voltages to achieve the semi-circular partitioning. The partition signals are then logically combined in AND gates to produce the final resolution of the velocity vector into the eight segments. It will be noted that, although the first differential of a time variant displacement value will yield a component velocity which is obviously dependent upon time, the time dependence is common to both the X and Y velocities. Since their relative magnitudes are compared for inequality only, the respective absolute magnitudes may vary so long as their relativity is preserved. Time, therefore, disappears as a variable in the computation. A doubling of the resultant velocity merely doubles the X and Y component velocities, for example, but does not change their relativity.

As in the first embodiment, it is equally feasible in the second embodiment to produce a finer resolution of the vectors, by providing smaller segments, the limits of which define the vector headings. For example, were it desirable to produce a resolution into sixteen headings, then eight diametral partitions are necessary, yielding eight pairs of semi-circles, and sixteen sectors discretely bounded by two radii from two different diameters. Four of these diameters will be disposed symmetrically about the north-south and east-west axes with an inclination of 11¼° with respect thereto. The four remaining diameters, subtending 22½° sectors complete the resolution. Instead of the tangent of 22½° to define the partitioning diameters, the tangent of 11¼° will instead be employed. Eight, instead of four discriminators, and sixteen, instead of eight, AND gates are required.

Other resolutions not specifically equated to the compass rose headings may be similarly achieved by resolving the circle into an even number of segments and employing an appropriate value for the tangent. Six diameters and twelve semicircles will, for example, produce twelve sectors of 30° each and would employ the tangent of 30° (.5774) in the computations. By reference to FIG. 4 it will readily be appreciated that for any constant valued rotating vector, the X and Y components thereof will vary sinusoidally with a quarter wavelength relative phase displacement. Any predetermined relative magnitude between the two component vectors will merely operate to reduce the amplitude of one of the waveforms. One of the waveforms will continue to be more positive than the other for 180°, the attenuation factor operating merely to shift the two equality points, which, perforce, must always be spaced 180° from one another. As the amplitude of one of the waveforms is attenuated, the equality points shift from NE and SW (no attenuation) to N and S (when one waveform is reduced to zero). If phase reversal is effected, without attenuation, the equality points occur, at NW and SE. Between these limits, any attenuation moves the equality points toward North and South, as the attenuation increases. Thus, with the capability of shifting the equality points anywhere within the full 360° by combinations of phase shift and varying degrees of attenuation, it is possible to define any desired angularity for a partitioning diameter. Any number of sectors may, therefore, be established to provide the necessary resolution. The attenuation factors would be provided by fixing the taps on voltage dividers, such as 607 and 609 in FIG. 3. If additional inverted or true attenuated voltages are required, voltage dividers with the requisite taps may be inserted between the lines 615 and 619 and ground. Thus, any number of diameters may be established to provide the necessary resolution.

Finally, it is possible to provide a non-uniform distribution of the direction determining sectors, if such be found to be useful. For example, it may be desirable to increase the resolution of the headings near the cardinal compass points and employ a coarser resolution of the intervening headings. For applications with requirements of this nature, the same diametral partitioning will be employed, but the diameters will subtend unequal sectors. The simplest example of this is one wherein four diameters are employed symmetrically disposed about the north-south and east-west axes with an inclination of 15° with respect thereto. These diameters will subtend 30° sectors straddling the cardinal axes, but 60° sectors about the NW, SW, SE, and NE vector headings. There will, therefore, be two different degrees of resolution.

As has been described in detail with respect to the two embodiments of the invention, advantage is taken of the relative magnitudes of the X and Y velocities to remove the independent variable time from the response. The resolution into the eight vector headings will proceed independent of the speed at which the character is traced. By suitable choice of the tangent values, the bounds of any sector may be defined so as to resolve the vectors therein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for processing waveforms manifesting a plurality of dependent variables having a common independent variable to derive an inter-relationship between the dependent variables comprising:

(a) means for producing further manifestations of the first differentials of the waveforms manifesting the dependent variables with respect to the independent variable;

(b) means for multiplying the thus obtained further manifestations by a plurality of constant multipliers to obtain product manifestations;

(c) means for comparing the relative magnitudes of said product manifestations in given combinations and producing signals indicative of their relativity, (d) and means for logically combining said signals in further given combinations.

2. Apparatus for continuously apportioning the slopes of a two dimensional space curve into N equal sectors, whose sum equals $2\pi$ radians, by processing a pair of waveforms manifesting the orthogonal displacements with respect to time of the successive points on the curve, comprising:

(a) means for differentiating said pair of waveforms to obtain a second pair of waveforms manifesting the orthogonally disposed velocity components;

(b) means for processing said second pair of waveforms to obtain signals indicative of the presence and absence of the resultant vector of said orthogonal component velocities in N semi-circles subtended by the diameters limiting the said sectors, (c) and means for combinatorially logically ANDing said signals to produce signals indicative of the sectors in which the successive slopes of said curve lie.

3. Apparatus for processing time variant waveforms representing the horizontal and vertical displacement with respect to time of a two dimensional space curve to continuously obtain the slope of the curve comprising:

(a) means differentiating said waveforms to obtain waveforms manifesting horizontal and vertical velocity components;

(b) means for multiplying said horizontal and vertical velocity components by a plurality of predetermined constants, including minus one, to obtain product manifestations;

(c) means for combinatorially comparing the relative magnitudes of the said product manifestations, and producing signals indicative of their relativity, (d) and means for logically combining said signals to produce further signals indicative of the successive slopes of said space curve.

4. Apparatus for continuously apportioning the slopes of a two dimensional space curve into eight equal sectors of $\pi/4$ radians each, by processing first and second waveforms respectively manifesting the X and Y orthogognally disposed displacements with respect to time of the successive points on the curve, comprising:

(a) means for differentiating said first and second waveforms to obtain third and fourth waveforms respectively manifesting $\dot{X}$ and $\dot{Y}$, the true X and Y velocity components;

(b) means for inverting the polarity of said third and fourth waveforms to obtain fifth and sixth waveforms respectively manifesting $-\dot{X}$ and $-\dot{Y}$, the negative values of the true velocity components;

(c) means for processing said fifth waveform to obtain a seventh waveform manifesting $.414(-\dot{X})$, where .414 equals the tangent of the angle $\pi/8$;

(d) means for processing said fourth waveform to obtain an eighth waveform manifesting $.414\dot{Y}$;

(e) a first comparing device for comparing said eighth waveform with said third waveform and producing an output response, A, only when said eighth waveform is more positive than said third waveform;

(f) a second comparing device for comparing said fifth waveform with said eighth waveform and producing an output response, B, only when said fifth waveform is more positive than said eighth waveform;

(g) a third comparing device for comparing said seventh waveform with said fourth waveform and producing an output response, C, only when said seventh waveform is more positive than said fourth waveform;

(h) a fourth comparing device for comparing said sixth waveform with said seventh waveform and producing an output response, D, only when said sixth waveform is more positive than said seventh waveform;

(i) an inverter connected to each of said comparing devices to produce an output response $\overline{A}$, $\overline{B}$, $\overline{C}$, and $\overline{D}$ when the respective comparing devices are not producing output responses;

(j) eight logical two-way AND gates combinatorially connected to said first, second, third, and fourth comparing devices and to each of said inverters and having the following connections, $A\overline{B}$, $C\overline{D}$, $\overline{A}B$, $\overline{C}D$, $\overline{C}B$, $\overline{AD}$, $C\overline{B}$, DA.

5. Apparatus for continuously apportioning the slopes of a two dimensional space curve into eight equal sectors of $\pi/4$ radians each, by processing first and second waveforms respectively manifesting the X and Y orthogonally disposed displacement with respect to time of the successive points on the curve, comprising:

(a) means for differentiating said first and second waveforms to obtain third and fourth waveforms respectively manifesting $\dot{X}$ and $\dot{Y}$, the true X and Y velocity components;

(b) a full wave rectifier for rectifying each of said third and fourth waveforms and producing a respective fifth and sixth waveform;

(c) means for detecting the polarity of said third and fourth waveforms and producing a signal A when $\dot{X}$ is positive, $\overline{A}$ when $\dot{X}$ is negative, B when $\dot{Y}$ is positive, and $\overline{B}$ when $\dot{Y}$ is negative;

(d) means for attenuating said fifth and sixth waveforms to obtain a respective seventh and eighth waveform each of which has an instantaneous amplitude .414 times the corresponding full amplitude waveform;

(e) a first comparing means for comparing said fifth waveform with said eighth waveform and producing an output response C when said fifth waveform is greater than said eighth waveform;

(f) a second comparing means for comparing said sixth waveform with said seventh waveform and producing an output response D when said sixth waveform is greater than said seventh waveform;

(g) an inverter connected to each of said comparing devices to produce output responses $\overline{C}$ and $\overline{D}$ responsive to the absence of a corresponding output response from the connected comparing device;

(h) four two input logical AND gates having the respective inputs BC, $\overline{B}C$, $\overline{A}D$, and AD, and operative in response to the simultaneous presence of two inputs to produce an output response indicative of the presence of the resultant velocity vector in those sectors symmetrically disposed about the X—X and Y—Y axes;

(i) and four four-input logical AND gates having the respective inputs $AB\overline{CD}$, $\overline{ABCD}$, $\overline{A}B\overline{CD}$, and $A\overline{BCD}$, and operative in response to the simultaneous presence of four inputs to produce an output responsive indicative of the presence of the resultant velocity vector in those sectors symmetrically disposed about the bisectors of the angles subtended by the X—X and Y—Y axes.

6. Apparatus for producing signals indicative of the presence of the slopes of successive points on a two dimensional space curve in N equal sectors, whose sum is $2\pi$ radians, by processing first and second waveforms respectively manifesting the X and Y cartesian coordinates of the points on the curve with respect to time, comprising:

(a) means for differentiating said waveforms to obtain third and fourth waveforms respectively manifesting $\dot{X}$ and $\dot{Y}$, the X and Y velocity components;

(b) means for rectifying said third and fourth waveforms to obtain fifth and sixth waveforms having only positive excursions;

(c) polarity detecting means for detecting the polarity of said third and fourth waveforms and producing signals indicative thereof;

(d) means for obtaining $N/8$ attenuated waveforms of said fifth waveform, wherein the attenuation factors are the respective tangents of the angles in the series $\pi/N$, $3\pi/N$, $5\pi/N$, $7\pi/N$, . . . , and the number of terms in the series equals $N/8$;

(e) means for obtaining $N/8$ attenuated waveforms of said sixth waveform, wherein the attenuation factors are the respective tangents of the angles in the series $\pi/N$; $3\pi/N$; $5\pi/N$; $7\pi/N$; . . . , and the number of terms in the series equals $N/8$;

(f) $N/8$ first comparing devices for comparing each of the attenuated waveforms of said fifth waveform with said sixth waveform and producing an output response manifestive of their relative inequalities;

(g) $N/8$ second comparing devices for comparing each of the attenuated waveforms of said sixth waveform with said fifth waveform and producing an output response manifestive of their relative inequalities;

(h) N logical AND gates having their inputs combinatorially connected to said first and said comparing devices and to said polarity detecting means, and operative to produce signals indicative of the presence of the resultant velocity vectors within the successive N sectors.

7. Apparatus for producing signals indicative of the presence of the slopes of successive points on a two dimensional space curve in N equal sectors, whose sum is $2\pi$ radians, by processing first and second waveforms respectively manifesting the X and Y cartesian coordinates of the points on the curve with respect to time, comprising:

(a) means for differentiating said waveforms to obtain third and fourth waveforms respectively manifesting $\dot{X}$ and $\dot{Y}$, the X and Y velocity components;

(b) inverting means for producing a polarity inversion of said third and fourth waveforms;

(c) means for obtaining $N/8$ attenuated waveforms of said fourth waveform, wherein the attenuation factors are the respective tangents of the angles in the series $\pi/N$, $3\pi/N$, $5\pi/N$, $7\pi/N$, . . . , and the number of terms in the series equals $N/8$;

(d) means for obtaining $N/8$ attenuated waveforms of said inverted third waveform, wherein the attenuation factors are the respective tangents of the angles in the series $\pi/N$, $3\pi/N$, $5\pi/N$, $7\pi/N$, . . . , and the number of terms in the series equals $N/8$;

(e) $N/8$ first comparators for comparing the relative magnitudes of said third waveform with each of the attenuated waveforms of said fourth waveform, and producing output responses when said third waveform is more positive than said attenuated waveforms;

(f) $N/8$ second comparators for comparing the relative magnitudes of the inverse of said third waveform with each of the attenuated waveforms of said fourth waveform, and producing output responses when said inverse waveform is more positive than said attenuated waveforms;

(g) $N/8$ third comparators for comparing the relative magnitudes of said fourth waveform with each of the attenuated waveforms of said inverse of said third waveform, and producing output responses when said fourth waveform is more positive than said attenuated waveforms;

(h) $N/8$ fourth comparators for comparing the relative magnitudes of said inverted fourth waveform with each of the attenuated waveforms of said inverse of said third waveform, and producing output responses when said inverted fourth waveform is less positive than said attenuated waveforms;

(i) $N/2$ inverters connected to each of said comparators, and operative to produce an output response upon the absence of an output response from the corresponding comparator;

(j) N two input logical AND gates combinatorially connected to said comparators and to said inverters and operative to produce an output response indicative of the presence of the resultant vector in the N sectors whose limits are defined by the combinatorial connections.

8. Apparatus for apportioning the slopes of successive points on a two dimensional space curve manifested by first and second time variant waveforms representing the X and Y cartesian displacements of the successive points into N equal sectors, the sum of which equals $2\pi$ radians, comprising:

(a) means for differentiating said first and second waveforms to obtain third and fourth waveforms manifesting $\dot{X}$ and $\dot{Y}$, the respective X and Y velocities;

(b) means including waveform attenuating devices, waveform polarity reversing devices, and waveform comparing devices for processing said waveforms and producing signals manifestive of the presence of the resultant of said X and Y velocities in $N/2$ semi-circles, the diameter partitioning each respective pair of said semi-circles being angularly disposed with respect to the two adjacent diameters by an angle of $\pi/N$ radians;

(c) and N logical AND gates each connected to receive, and operative responsive thereto, a different pair of signals manifesting the presence of the resultant velocity vector in the $N/2$ semi-circles, wherein each pair of signals manifests the presence of the vector in two semi-circles having a discreet overlapping sector of $\pi/N$ degrees.

References Cited by the Examiner

UNITED STATES PATENTS

| | | | |
|---|---|---|---|
| 2,784,359 | 3/1957 | Kamm | 318—28 |
| 3,015,730 | 1/1962 | Johnson | 250—217 |
| 3,068,467 | 12/1962 | Grimaila | 235—189 |
| 3,145,303 | 8/1964 | Hobrough | 250—217 |

MAYNARD R. WILBUR, *Primary Examiner.*

MALCOLM A. MORRISON, *Examiner.*

J. E. SMITH, *Assistant Examiner.*

UNITED STATES PATENT OFFICE
CERTIFICATE OF CORRECTION

Patent No. 3,297,988 January 10, 1967

Evon C. Greanias et al.

It is hereby certified that error appears in the above numbered patent requiring correction and that the said Letters Patent should read as corrected below.

Column 15, line 4, for "responsive" read -- response --; line 43, after "said", second occurrence, insert -- second --.

Signed and sealed this 28th day of November 1967.

(SEAL)
Attest:

Edward M. Fletcher, Jr.
Attesting Officer

EDWARD J. BRENNER
Commissioner of Patents